(12) United States Patent
Olsson et al.

(10) Patent No.: US 6,979,156 B2
(45) Date of Patent: Dec. 27, 2005

(54) MACHINE SPINDLE HAVING A FORCE-AMPLIFIER DRAWBAR ASSEMBLY

(75) Inventors: Sören Olsson, Sandviken (SE); Kjell Englund, Valbo (SE)

(73) Assignee: Sandvik AB, Sandviken (SE)

( * ) Notice: Subject to any disclaimer, the term of this patent is extended or adjusted under 35 U.S.C. 154(b) by 21 days.

(21) Appl. No.: 10/823,651

(22) Filed: Apr. 14, 2004

(65) Prior Publication Data

US 2005/0002745 A1 Jan. 6, 2005

(30) Foreign Application Priority Data

Apr. 15, 2003 (SE) .................. 0301107

(51) Int. Cl.[7] .......................... B23B 31/26; B23C 5/26
(52) U.S. Cl. ................. 409/233; 409/136; 408/239 R
(58) Field of Search ............... 409/233, 136, 409/135, 232; 408/239 R, 240; 267/130, 267/119

(56) References Cited

U.S. PATENT DOCUMENTS

| | | | |
|---|---|---|---|
| 4,668,137 A | * | 5/1987 | Iwakura ............... 409/233 |
| 4,863,324 A | * | 9/1989 | Blessing .............. 409/233 |
| 4,915,553 A | * | 4/1990 | Lazarevic ............ 409/233 |
| 5,052,866 A | * | 10/1991 | Bauch et al. ........ 409/233 |
| 5,192,061 A | * | 3/1993 | Schaublin et al. ... 269/228 |
| 5,251,887 A | * | 10/1993 | Arnold et al. ....... 269/221 |
| 6,722,827 B1 | * | 4/2004 | Anderson ............ 409/233 |

FOREIGN PATENT DOCUMENTS

DE  4330399 A1 * 3/1995 .......... F16H 21/00

* cited by examiner

*Primary Examiner*—Boyer D. Ashley
*Assistant Examiner*—Dana Ross
(74) *Attorney, Agent, or Firm*—Drinker Biddle & Reath LLP

(57) ABSTRACT

A machine spindle includes a casing and a drawbar assembly disposed in the casing for clamping a tool in place. The drawbar assembly includes a front drawbar having a tool clamp, and a rear drawbar movable rearwardly under a spring force for pulling the front drawbar rearwardly to activate the clamp. A rearward force from the rear drawbar is transmitted to the front drawbar by a wedge arrangement that includes multiple pairs of wedges that have cooperative sliding surfaces that make surface contact (as opposed to line contact) with one another. The cooperative sliding surfaces are configured to provide an amplified rearward force against the front drawbar during a final stage of clamping.

22 Claims, 4 Drawing Sheets

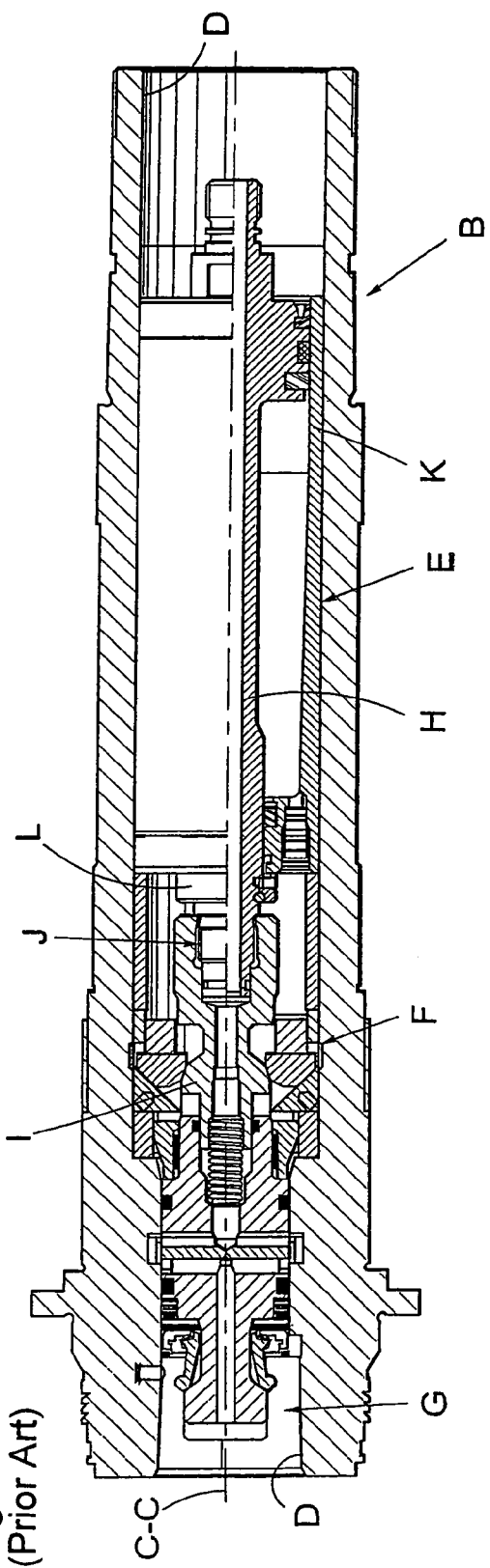
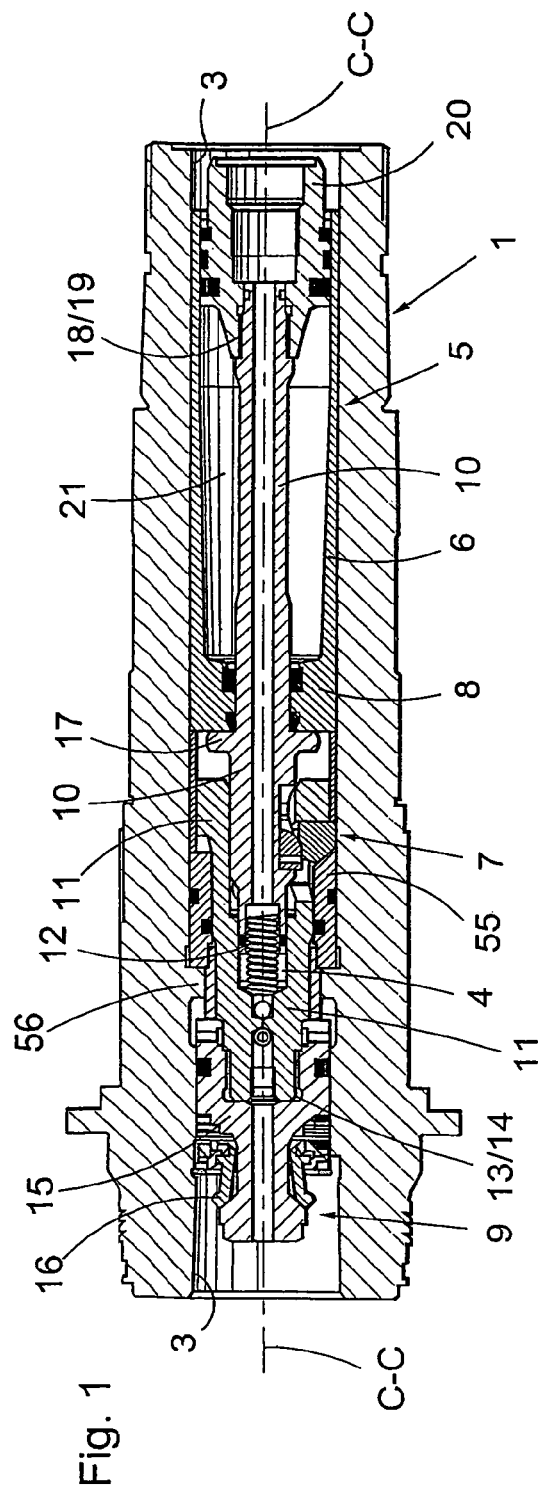
Fig. 1A (Prior Art)
Fig. 1

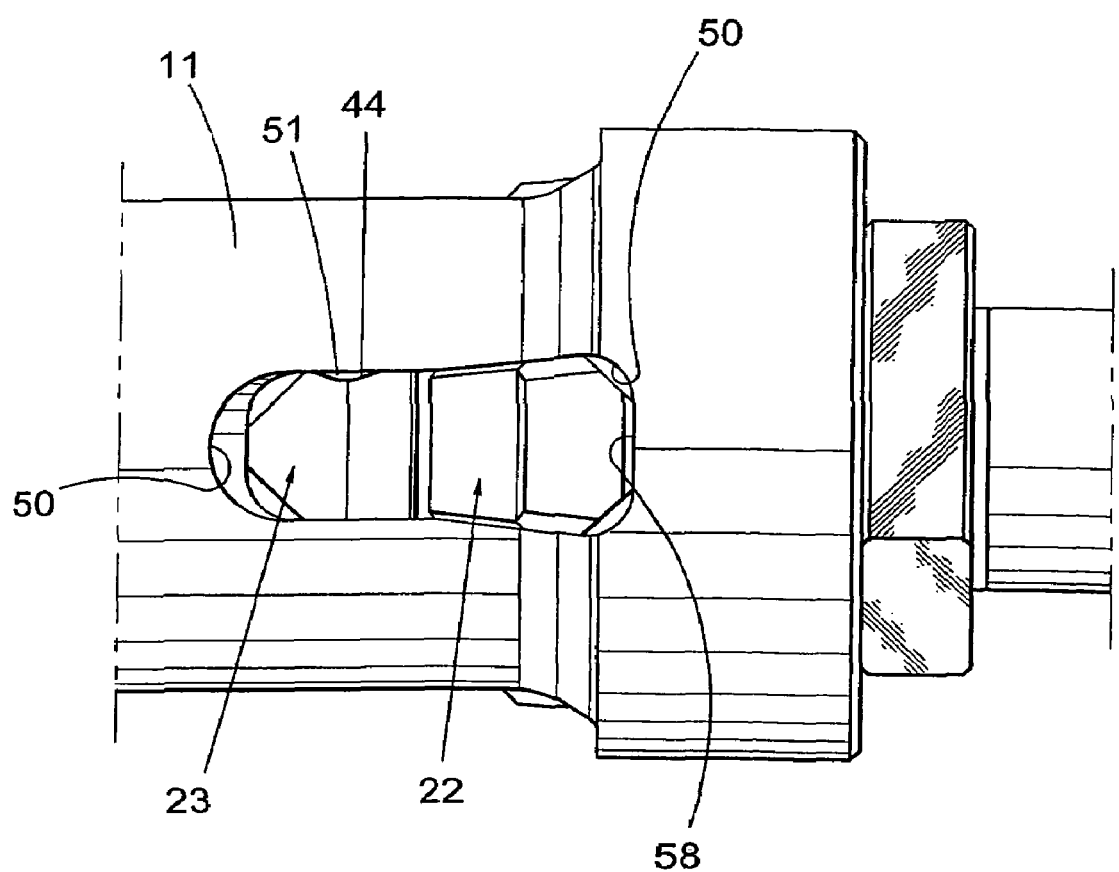

MACHINE SPINDLE HAVING A FORCE-AMPLIFIER DRAWBAR ASSEMBLY

This application claims priority under 35 U.S.C. §119 to patent application Ser. No. 0301107-9 filed in Sweden on Apr. 15, 2003, the entire content of which is hereby incorporated by reference.

TECHNICAL FIELD OF THE INVENTION

The present invention relates to a force-amplifier included in a machine spindle having a clamping member, the force-amplifier comprising a drawbar that is connected to the clamping member, the force-amplifier comprising a number of sets of cooperating wedges.

DESCRIPTION OF THE PRIOR ART

Force-amplifiers, so-called boosters, are previously known that are built-in in machine spindles having a clamping member, the machine spindles usually also comprising a cup spring or a gas spring, which applies an axial force on the clamping member via one or more drawbars. The force-amplifier provides an increase of the axial force during the final phase of the axial motion that the drawbar(s) executes in connection with activation of the clamping member.

The known force-amplifiers comprise a number of sets of cooperating wedges, which provide a gearing of the axial force. A problem of known gearing mechanisms is that the cooperating surfaces of the cooperating wedges only have line contact or point contact with each other. This results from the wedges normally being manufactured from segments of turned rings. It is also common that the sets of wedges are four in number, which implies an overdetermination, and thereby all the sets of wedges are not participating in the force-amplifying function to an equally large extent. An additional problem is that the arrangement of cooperating wedges takes up relatively large space in the radial direction, which means that the diameter of the machine spindle becomes relatively large.

OBJECTS AND FEATURES OF THE INVENTION

A primary object of the present invention is to provide a force-amplifier of the kind defined in the introduction, with the wedges included a set of wedges cooperating mutually in a way that reduces the friction and the wear.

Another object of the present invention is that all sets of wedges in the force-amplifier should be participating in the force-amplifying function to an equally large extent.

Yet an object of the present invention is to decrease the radial space requirement for the force-amplifier, which results in a smaller diameter of the machine spindle and enables higher speed of rotation of the same.

At least the primary object of the present invention is realized by a machine spindle which comprises a casing defining a center axis, and a clamping device disposed in the casing for clamping a tool. The clamping device includes front and rear drawbars arranged substantially coaxially in the casing. The front drawbar includes a clamp at its front end for gripping a tool in response to rearward movement of the front drawbar. The rear drawbar is axially movable relative to the front drawbar. The clamping device further includes a wedge assembly for transmitting rearward movement of the rear drawbar to the front drawbar for rearwardly moving the front drawbar. The wedge assembly includes a plurality of sets of wedges spaced circumferentially apart. Each set includes a radially inner wedge and a radially outer wedge arranged in sliding contact with one another. The inner wedge is arranged to be displaced rearwardly by the rear drawbar and, in response thereto, for displacing the outer wedge generally radially outwardly. The inner and outer wedges include respective parallel planar surfaces arranged in surface contact for cooperative sliding engagement with one another and oriented at an oblique angle with respect to the axis.

Preferably, the respective parallel planar surfaces comprise a first pair of parallel planar cooperative surfaces arranged for cooperative sliding engagement with one another during one stage of rearward movement of the rear drawbar, and a second pair of parallel planar cooperative surfaces arranged for cooperative sliding engagement with one another during a subsequent stage of rearward movement of the rear drawbar. A first angle formed between the first pair of cooperative surfaces and the axis is different from a second angle formed between the second pair of cooperative surfaces and the axis. The first angle is preferably greater than the second angle.

Another aspect of the invention relates to the drawbar assembly per se which is adapted to be employed in a machine spindle.

BRIEF DESCRIPTION OF THE DRAWINGS

Below, an example of prior art as well as an embodiment of the invention will be described, reference being made to the accompanying drawings.

FIG. 1A shows a machine spindle according to prior art, a. force-amplifier according to prior art being included in the machine spindle.

FIG. 1 shows a machine spindle having a force-amplifier according to the present invention, the machine spindle also comprising a newly developed gas spring.

FIG. 6 shows a detail of a drawbar included in the force-amplifier.

DETAILED DESCRIPTION OF A PREFERRED EMBODIMENT OF THE INVENTION

Figure 2:
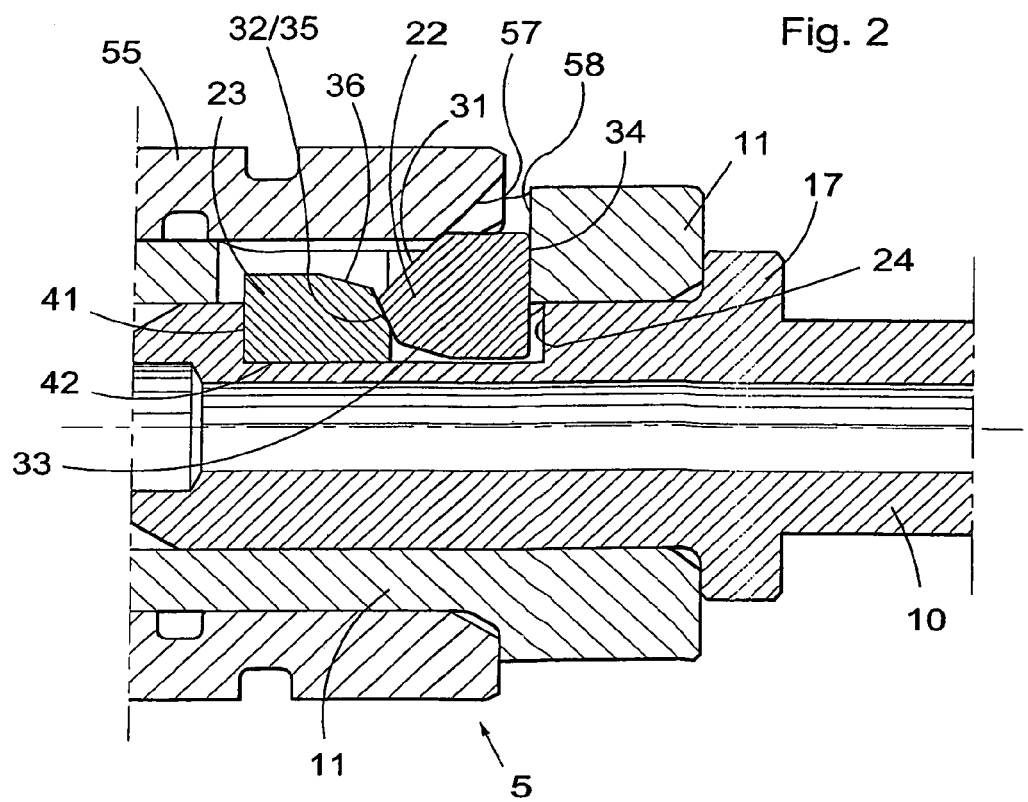
FIG. 2 shows in detail essential components of the force-amplifier in the starting position.

The conventional machine spindle shown in FIG. 1A comprises a casing B, which is rotationally symmetrical in respect of a longitudinal centre axis C—C of the machine spindle. The casing B has an internal, through-channel D, which has a circular cylindrical cross-section and is symmetrical in respect of the centre axis C—C, i.e., the centre axis C—C also constitutes the centre axis of the channel D, which has varying cross-section along the length thereof in order to enable assembly of the different components included in the machine spindle. In the channel D, a clamping mechanism of the machine spindle is arranged that comprises a gas spring E, a force-amplifier F as well as a clamping member G, the force-amplifier F being situated between the gas spring E and the clamping member G. As is seen in FIG. A, a drawbar H of the gas spring E slides within a housing K and is interconnected with a second drawbar I of the force-amplifier F by means of a threaded joint J, which accordingly is located between the gas spring E and the force-amplifier F.

The machine spindle shown in FIG. 1 comprises a casing 1, which is rotationally symmetrical in respect of a longitudinal centre axis C—C of the machine spindle. The casing 1 has an internal, through channel 3, which has a substantially circular cylindrical cross-section and is symmetrical in respect of the centre axis C—C, i.e., the centre axis C—C also constitutes the centre axis of the channel 3, which has varying cross-section along the length thereof in order to enable assembly of the different components included in the machine spindle. In the channel 3, a clamping mechanism of the machine spindle is arranged that comprises a gas spring 5, a force-amplifier 7 as well as a conventional clamping member 9, the force-amplifier 7 being situated between the gas spring 5 and the clamping member 9.

The gas spring 5 comprises a housing 6 having an end portion 8, at the left end of the gas spring 5 in FIG. 1. The drawbar 10 slides within the housing 6.

As is seen in FIG. 1, a one-piece first, or front, drawbar 10 extends from the right end of the gas spring 5 to the area of the force-amplifier 7. In that connection, the front (left) end of the first drawbar 10 in FIG. 1 is received in an axially extending recess 4 of a second, or rear, drawbar 11, in relation to which the first drawbar 10 can move in the longitudinal direction by a limited distance. A spring 12 arranged between the front end of the first drawbar 10 and a recess of the second drawbar 11 damps the same motion. When the first drawbar 10 is displaced forwardly (towards the left in FIG. 1), the spring 12 will push the second drawbar 11 also forwardly (towards the left) before a flange 17 of the first drawbar 10 gets into contact with the second drawbar 11. At its front end, the second drawbar 11 has a male thread 13, which cooperates with a female thread 14 of an activating means 15 of the clamping member 9. Thus, the male thread 13 and the female thread 14 together form a first threaded joint. The second drawbar 11 is included as part of the force-amplifier 7 and both the second drawbar 11 and the activating means 15 are axially displaceable in the channel 3 of the casing 1.

The clamping member 9 also comprises segments 16 which in an initial phase of assembly or disassembly of a tool are stationary in relation to the casing 1 in the longitudinal direction thereof. Said segments 16 are actuated by the activating means 15 when the same is displaced axially in the channel 3, the free ends of the segments 16 moving in radial and axial directions and effecting clamping of a tool coupling, for instance, of the type Coromant Capto®. This is prior art, which therefore is not described in detail.

As may be seen in FIG. 1, the first drawbar 10 is provided with a flange 17 in the area of the first drawbar 10 that is between the gas spring 5 and the force-amplifier 7. In the position of the machine spindle shown in FIG. 1, the flange 17 has come to abutment against the front end of the gas spring 5. During passage of the first drawbar 10 through the front end of the gas spring 5 in FIG. 1, the first drawbar 10 is sealed in a conventional way.

In the area of the rear (right) end of the gas spring 5 in FIG. 1, the first drawbar 10 is provided with a male thread 18, which cooperates with a female thread 19 of a piston 20 of the gas spring 5, which piston is displaceable in relation to the housing 6 of the gas spring 5. In that connection, the piston 20 is, in a conventional way, sealed against the housing 6 wherein the housing 6 and the piston 20 together define an internal space 21 of the gas spring 5, in which space a gas medium, normally nitrogen gas, is contained. The gas medium has a pressure that is higher than the atmospheric pressure.

Upon a comparative study of the machine spindles according to FIG. 1A and FIG. 1, respectively, it is seen that the machine spindle according to FIG. 1 has a smaller length than the known machine spindle according to FIG. 1A. This has been enabled by the fact that the threaded joints J and 18/19, respectively, between the parts of the drawbar H and 10, respectively, have mutually different positions in the machine spindle. Thereby, a shortening of the length of the first drawbar 10 has been provided in comparison with the length of the drawbar H. The threaded joint 18/19 at the piston 20 has been arranged without this part of the first drawbar 10 having needed to be extended, however, a minor increase of the diameter has been made in connection with the arrangement of the threaded joint 18/19. However, said increase of the diameter is, in practice, of no importance.

The machine spindle according to the present invention also comprises a force-amplifier 7, which will be described more in detail below, reference being made to FIGS. 2–6.

The force-amplifier 7 comprises the part of the first drawbar 10 located outside the housing 6 of the gas spring 5 as well as the second drawbar 11, which accordingly is axially displaceable in the channel 3 of the casing 1. The force-amplifier 7 also comprises a number of sets of cooperating wedges, the force-amplifier 7 comprising three such sets that are evenly distributed along the circumference of the internal channel 3.

Each set of cooperating wedges of the force-amplifier 7 comprises a first, or radially inner, wedge 22 as well as a second, or radially outer, wedge 23, said wedges 22 and 23 being arranged in an appurtenant countersink 24 in the first drawbar 10. Thereby, the radial space requirement for each set of wedges 22, 23 is reduced.

Figure 3:
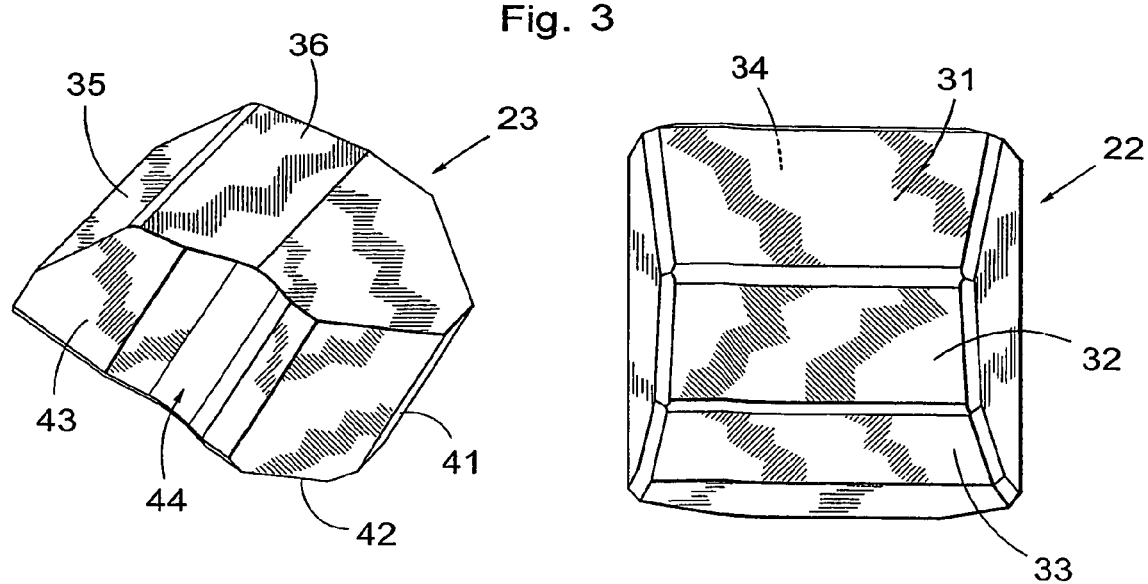
FIG. 3 shows separately two wedges included in the force-amplifier.
Figure 4:
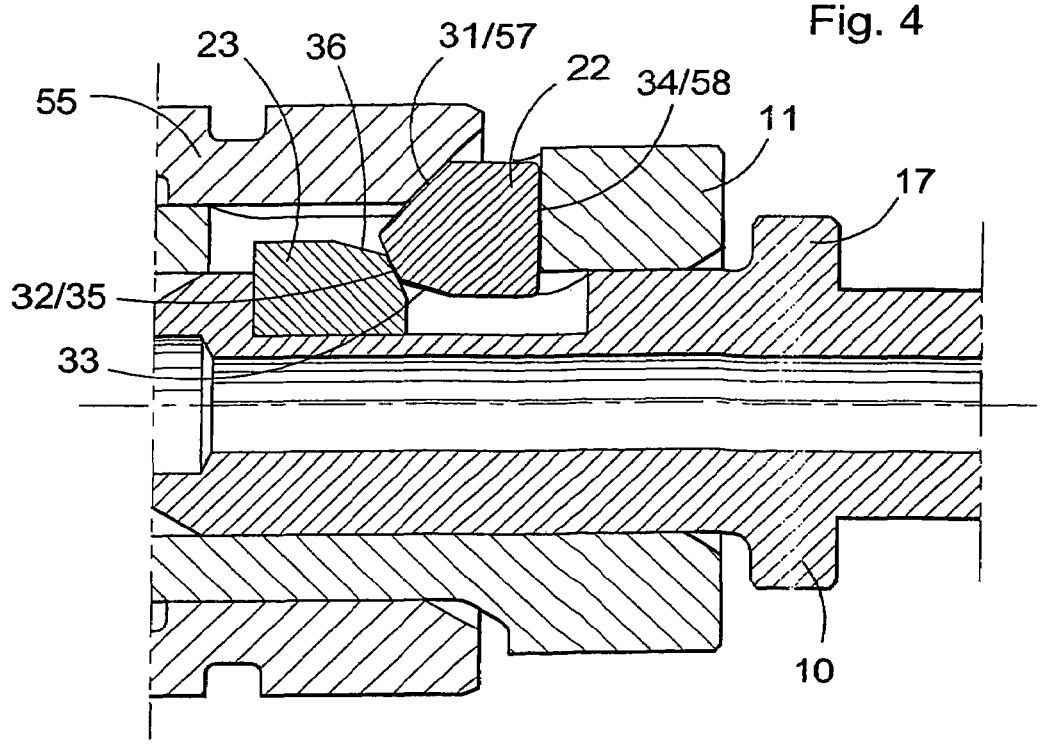
FIG. 4 shows in detail the essential components of the force-amplifier in an intermediate position.

In FIG. 3, the wedges 22 and 23 are shown separately. The first wedge 22 has a first sliding surface 31, a second sliding surface 32, a third sliding surface 33 and a fourth sliding surface 34, the fourth sliding surface 34 being situated in the plane of the paper in FIG. 3. All said sliding surfaces are preferably planar and oriented at an oblique angle relative to the axis C—C. The mutual angles between adjacent sliding surfaces are preferably obtuse. The second wedge 23 has a fifth sliding surface 35 and a sixth sliding surface 36, said two sliding surfaces 35, 36 preferably being planar. The mutual angle between the same sliding surfaces 35, 36 is preferably obtuse. The second wedge 23 also has a first support surface 41 and a second support surface 42, said support surfaces 41, 42 in the embodiment illustrated having an extension perpendicular to each other. The second wedge 23 also has a side surface 43 having a notch 44, the side surface 43 generally having an extension transverse to the fifth and sixth sliding surfaces 35, 36. Preferably, the sliding surfaces and the side surfaces of the wedges 22 and 23 have a friction-reducing coating.

The second drawbar 11 of the force-amplifier 7 is provided with a number of radial grooves 50, see FIG. 6, the number of grooves 50 corresponding to the number of sets of wedges, i.e., one set of wedges 22, 23 is received in each groove 50. As may be seen in FIG. 6, the groove 50 has a generally elongate shape in the longitudinal direction of the second drawbar 11 and the groove 50 widens towards a rear end thereof in the axial direction of the second drawbar 11. The first wedge 22, which cooperates with this end of the groove 50, has a corresponding shape. The countersink 24 is also provided with a bulge 51 on one side wall thereof, said bulge 51 being intended to cooperate with the notch 44 of the second wedge 23. Furthermore, the groove 50 has, in the area of the widened end thereof, an eighth sliding surface 58, which generally has an extension transverse to the centre axis C—C of the machine spindle.

In the force-amplifier 7, also an anvil 55 is included in the form of a sleeve, which is arranged in the internal channel 3 and encircles the second drawbar 11, the anvil 55 abutting against a shoulder 56 in the internal channel 3. At the end thereof turned from the shoulder 56, the anvil 55 has a sloping, seventh sliding anvil surface 57 which is oriented obliquely relative to the axis C—C and intended to cooperate with the first sliding surface 31 of the first wedge 22. The first planar sliding surface 31 and the seventh planar sliding surface 57 have an inclination of approx. 45° to the centre axis C—C of the machine spindle. The anvil 55 is stationarily mounted in the internal channel 3, i.e., the anvil 55 abuts permanently against the shoulder 56.

The above-described force-amplifier 7 operates in the following way. In FIG. 2, the force-amplifier 7 is shown in the starting position, wherein the free end of the second drawbar 11 abuts against the flange 17 of the first drawbar 10. In this position, the first drawbar 10 is accordingly displaced maximally towards the front (left in FIG. 2), this being effected by means of an external hydraulic piston (not shown) or the like, which pushes against the rear (right) end of the first drawbar 10, see FIG. 1. The forward (leftward) displacement of the second drawbar 11 is effected against the action of the pressure medium contained in the gas spring 5. In that connection, the segments 16 are in the radially innermost positions thereof and a desired tool may be mounted on the clamping member 9. When the force from the external hydraulic piston is relieved or otherwise enables the first drawbar 10 to move towards the rear in FIG. 2, under the action of energy stored in the gas spring 5, the transitional phase shown in FIG. 4 will be initiated. In that connection, the direct abutment between the second drawbar 11 and the flange 17 of the first drawbar 10 will cease. The rearward displacement of the first drawbar 10 in FIG. 4 causes a displacement of the second planar sliding surface 32 of the first wedge 22 to occur in relation to the fifth planar sliding surface 35 of the second wedge 23. The second planar sliding surface 32 of the first wedge 22 and the fifth planar sliding surface 35 of the second wedge 23 have an inclination of approx. 65° to the centre axis C—C of the machine spindle. In that connection, the first wedge 22 will move radially outwardly, which means that the first planar sliding surface 31 of the first wedge 22 will be displaced along the seventh planar sliding surface 57 of the anvil 55 at the same time as the fourth planar sliding surface 34 of the first wedge 22 is displaced. in relation to the eighth planar sliding surface 58 of the groove 50 in the second drawbar 11. Since the anvil 55 is stationary, the radial displacement outwardly of the first wedge 22 will mean that a certain axial rearward displacement of the second drawbar 11 takes place in FIG. 4.

Figure 5:
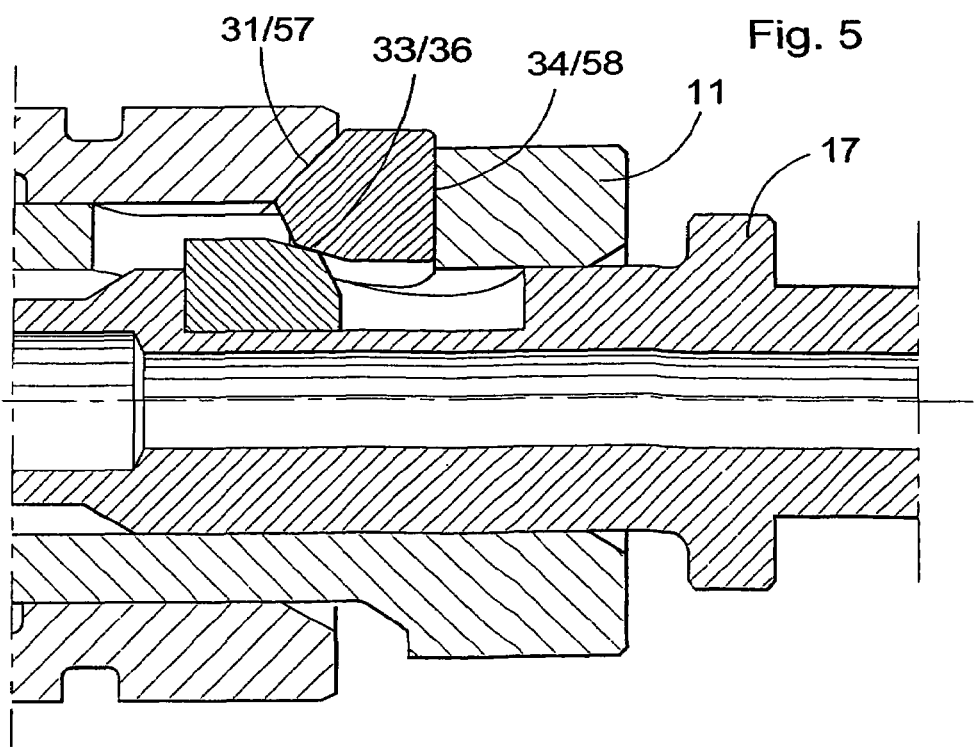
FIG. 5 shows in detail the essential components of the force-amplifier in a position where the force is raised.

A continued relative displacement between the first wedge 22 and the second wedge 23 eventually results in the cooperation between the second planar sliding surface 32 and the fifth planar sliding surface 35 ceasing, and then the third planar sliding surface 33 of the first wedge 22 will begin cooperation with the sixth planar sliding surface 36 of the second wedge 23, see FIG. 5. Thereby, the force-amplifying phase has been initiated. Since the third sliding surface 33 and the sixth sliding surface 36 have a substantially smaller inclination in relation to the centre axis C—C of the machine spindle than the second sliding surface 32 and the fifth sliding surface 35, the relative displacement between the third sliding surface 33 and the sixth sliding surface 36 will generate a smaller radial displacement outwardly of the first wedge 22 for a corresponding axial displacement of the first drawbar 10 in comparison with the above-described relative displacement between the second sliding surface 32 and the fifth sliding surface 35. However, the force applied from the surface 35 of the second wedge 23 to the surface 33 of the wedge 22 now has a larger component in the radially outward direction, which, via the surfaces 31, 57, results in an amplification of the axial rearward force that is applied to the second drawbar 11.

That amplification occurs at the transition from cooperation between the second sliding surface 32 and the fifth sliding surface 35 to cooperation between the third sliding surface 33 and the sixth sliding surface 36. During the cooperation between the third sliding surface 33 and the sixth sliding surface 36, the transfer of the force to the second drawbar takes place as before, i.e., the first sliding surface 31 of the first wedge 22 cooperates with the seventh sliding surface 57 of the anvil 55 and the fourth sliding surface 34 of the first wedge 22 transfers the axial force to the eighth sliding surface 58 of the second drawbar 11.

In general it is the case that the mutually cooperating sliding surfaces 32 and 35, and 33 and 36, respectively, of the cooperating wedges 22, 23 are parallel with each other, whereby a satisfactory surface contact is guaranteed, as compared to a less desirable line contact. Also the first sliding surface 31 of the first wedge 22 is parallel with the seventh sliding surface 57 of the anvil 55.

Upon study of FIG. 6, it is realized that the cooperating design of the widened part of the groove 50 and the conicity of the first wedge 22 result in that the wedge 22 cannot be axially displaced but can be displaced solely radially in relation to the second drawbar 11. As for the second wedge 23, it is, as has been pointed out above, provided with a notch 44 that in the mounted position of the second wedge 23 cooperates with a bulge 51 of the countersink 24. Thereby, it is guaranteed that the second wedge 23 follows the first drawbar 10 when the same moves from the position according to FIG. 5 to the position according to FIG. 2.

FEASIBLE MODIFICATIONS OF THE INVENTION

In the above-described embodiment, the first drawbar 10 and the piston 20 are connected by means of a threaded joint. However, within the scope of the present invention, alternative ways of dismountably connecting the first drawbar 10 and the piston 20 are also conceivable, wherein, for an exemplifying and not limiting purpose, a bayonet coupling may be mentioned, the same being locked in connecting position by means of, for instance, some type of locking screw.

Neither it is necessary that the threaded joint is located in connection with the piston 20 but, as far as space admits, the threaded joint may, for instance, be located on an intermediate area of the first drawbar 10.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:
1. A machine spindle comprising:
a casing defining a center axis; and a clamping device disposed in the casing for clamping a tool, the clamping device comprising:

front and rear drawbars arranged substantially coaxially in the casing, the front drawbar having a clamp at its front end for gripping a tool in response to rear movement of the front drawbar, the clamp disposed within the casing, the rear drawbar being axially movable relative to the front drawbar;

a spring for biasing the rear drawbar rearwardly; and a wedge assembly for transmitting rearward movement of the rear drawbar to the front drawbar for rearwardly moving the front drawbar, the wedge assembly comprising a plurality of sets of wedges spaced circumferentially apart, each set including a radially inner wedge and a radially outer wedge arranged in sliding contact with one another, the inner wedge arranged to be displaced rearwardly by the rear drawbar for displacing the outer wedge generally radially outwardly, wherein the inner and outer wedges include respective parallel planar surfaces arranged in surface contact for cooperative sliding engagement with one another and oriented at an oblique angle with respect to the axis.

2. The machine spindle according to claim 1 wherein the respective parallel planar surfaces comprise a first pair of parallel planar cooperative surfaces arranged for cooperative sliding engagement with one another during one stage of rearward movement of the rear drawbar, and a second pair of parallel planar cooperative surfaces arranged for cooperative sliding engagement with one another during a subsequent stage of rearward movement of the rear drawbar, wherein a first angle formed between the first pair of cooperative surfaces and the axis is different from a second angle formed between the second pair of cooperative surfaces and the axis.

3. The machine spindle according to claim 2 wherein the first angle is greater than the second angle.

4. The machine spindle according to claim 3 further including an anvil having an anvil surface oriented obliquely relative to the axis and arranged to displace the outer wedge rearwardly against the front drawbar in response to the generally radially outward movement of the outer wedge, wherein a radially outward force applied from the inner wedge to the outer wedge is greater when the second pair of cooperative surfaces are in engagement than when the first pair of cooperative surfaces are in engagement, for amplifying a rear force applied to the front drawbar during the subsequent stage of rearward movement of the rear drawbar.

5. The machine spindle according to claim 4 wherein the surfaces of the inner wedge that comprise the first and second pairs of cooperative surfaces form an obtuse angel with one another, and the surfaces of the outer wedge that comprise the first and second pairs of cooperative surfaces form an obtuse angle between one another.

6. The machine spindle according to claim 4 wherein the rear drawbar includes a plurality of circumferentially spaced radially outwardly open countersinks in which respective wedge pairs are partially disposed.

7. The machine spindle according to claim 6 wherein each countersink includes a bulge received in a notch formed in the respective inner wedge to restrain the inner wedge against axial movement relative to the rear drawbar.

8. The machine spindle according to claim 6 wherein the front drawbar includes a plurality of circumferentially spaced, radially inwardly open grooves aligned generally radially with respective countersinks of the rear drawbar and in which respective wedge pairs are partially disposed.

9. The machine spindle according to claim 8 wherein a portion of each groove widens circumferentially, the respective outer wedge widening in complementary fashion to the groove, wherein the outer wedge is constrained against axial movement relative to the front drawbar.

10. The machine spindle according to claim 4 wherein the front drawbar includes a plurality of circumferentially spaced, radially inwardly open grooves aligned generally radially with respective countersinks of the rear drawbar and in which respective wedge pairs are partially disposed.

11. The machine spindle according to claim 2 wherein at least some of the cooperative surfaces are provided with an anti-friction coating.

12. The machine spindle according to claim 1 wherein the rear drawbar includes a plurality of circumferentially spaced radially outwardly open countersinks in which respective wedge pairs are partially disposed.

13. The machine spindle according to claim 1, the front drawbar includes a plurality of circumferentially spaced, radially inwardly open grooves aligned generally radially with respective countersinks of the rear drawbar and in which respective wedge pairs are partially disposed.

14. A force-amplifier drawbar assembly comprising:

front and rear drawbars arranged substantially coaxially, the front drawbar including a clamp at its front end for gripping a tool in response to rear movement of the front drawbar, the rear drawbar being axially movable relative to the front drawbar, and a wedge assembly for transmitting rearward movement of the rear drawbar to the front drawbar for rearwardly moving the front drawbar, the wedge assembly comprising a plurality of sets of wedges spaced circumferentially apart, each set including a radially inner wedge and a radially outer wedge arranged in sliding contact with one another, the inner wedge arranged to be displaced rearwardly by the rear drawbar for displacing the outer wedge generally radially outwardly, wherein the inner and outer wedges include respective parallel planar surfaces arranged in surface contact for cooperative sliding engagement with one another and oriented at an oblique angle with respect to the axis.

15. The drawbar assembly according to claim 14 wherein the respective parallel planar surfaces comprise a first pair of parallel planar cooperative surfaces arranged for cooperative sliding engagement with one another during one stage of rearward movement of the rear drawbar, and a second pair of parallel planar cooperative surfaces arranged for cooperative sliding engagement with one another during a subsequent stage of rearward movement of the rear drawbar, wherein a first angle formed between the first pair of cooperative surfaces and the axis is different from a second angle formed between the second pair of cooperative surfaces and the axis; wherein the first angle is greater than the second angle.

16. The drawbar assembly according to claim 14 further including an anvil having an anvil surface oriented obliquely relative to the axis and arranged to displace the outer wedge rearwardly against the front drawbar in response to the generally radially outward movement of the outer wedge, wherein a radially outward force applied from the inner wedge to the outer wedge is greater when the second pair of cooperative surfaces are in engagement than when the first pair of cooperative surfaces are in engagement, for amplifying a rear force applied to the front drawbar during the subsequent stage of rearward movement of the rear drawbar.

17. The drawbar assembly according to claim 16 wherein at least some of the cooperative surfaces are provided with an anti-friction coating.

18. The drawbar assembly according to claim 16 wherein the rear drawbar includes a plurality of circumferentially spaced radially outwardly open countersinks in which respective wedge pairs are partially disposed.

19. The drawbar assembly according to claim 18 wherein each countersink includes a bulge received in a notch formed in the respective inner wedge to restrain the inner wedge against axial movement relative to the rear drawbar.

20. The drawbar assembly according to claim 18 wherein the front drawbar includes a plurality of circumferentially spaced, radially inwardly open grooves generally radially aligned with the countersinks of the rear drawbar and in which respective wedge pairs are partially disposed.

21. The drawbar assembly according to claim 20 wherein a portion of each groove widens circumferentially, the respective outer wedge widening in complementary fashion to the groove, wherein the outer wedge is constrained against axial movement relative to the front drawbar.

22. The drawbar assembly according to claim 14, further including a spring for biasing the rear drawbar rearwardly.

* * * * *